Jan. 21, 1930.  F. SCHLAYER  1,744,334
THRASHING MACHINE
Original Filed Sept. 13, 1923   6 Sheets-Sheet 1
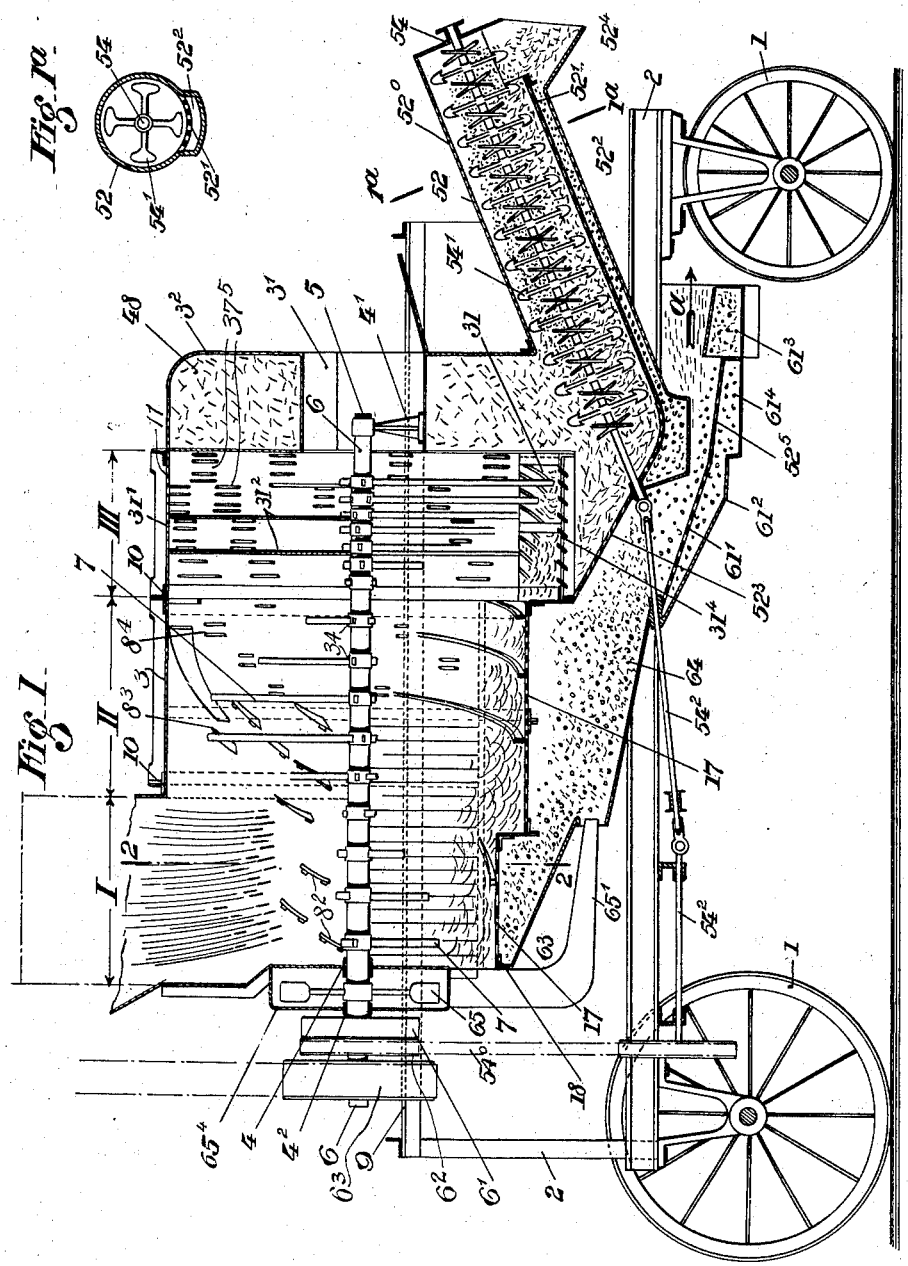
Inventor:
F. Schlayer
By Marks & Clark
Attys.

Jan. 21, 1930.  F. SCHLAYER  1,744,334
THRASHING MACHINE
Original Filed Sept. 13, 1923   6 Sheets-Sheet 2
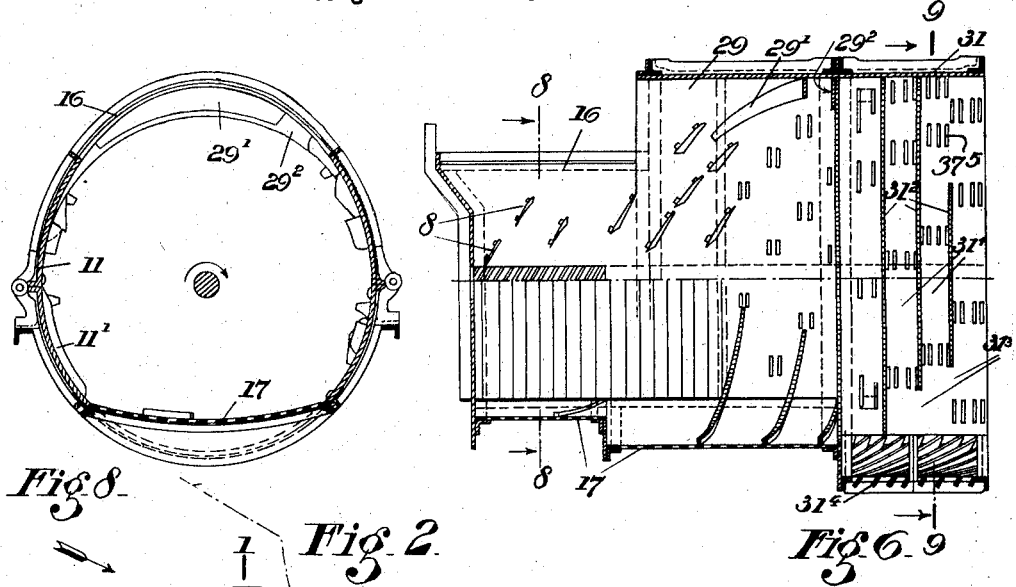
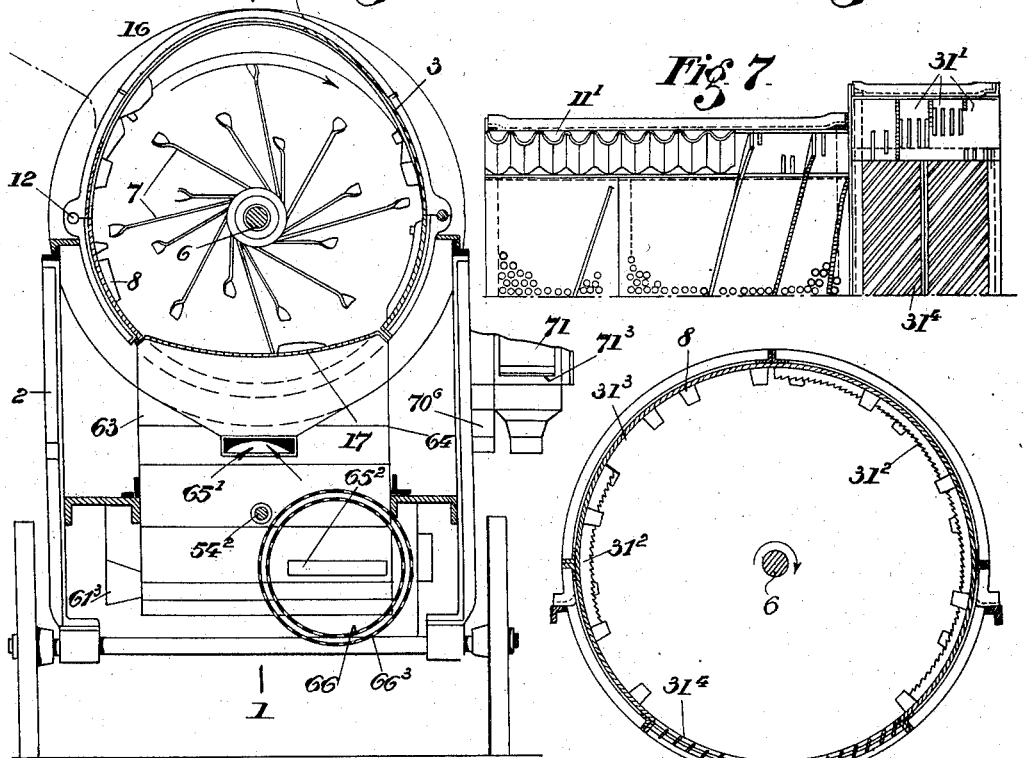
Inventor:
F. Schlayer
By Marks & Clerk
Attys.

Jan. 21, 1930. F. SCHLAYER 1,744,334
THRASHING MACHINE
Original Filed Sept. 13, 1923 6 Sheets-Sheet 3
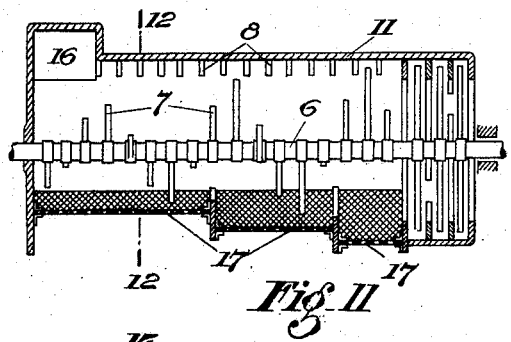
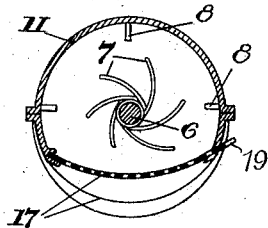
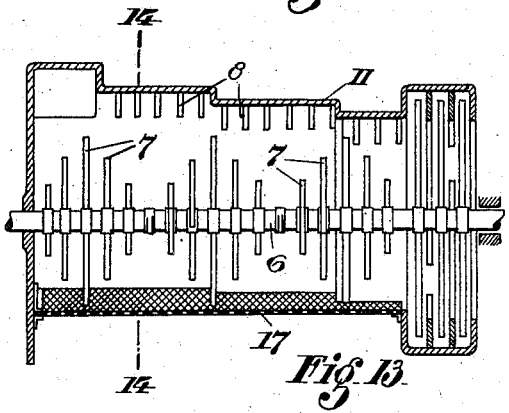
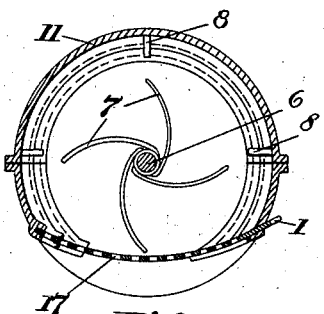
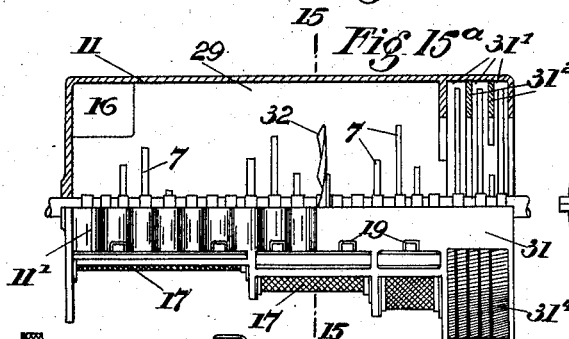
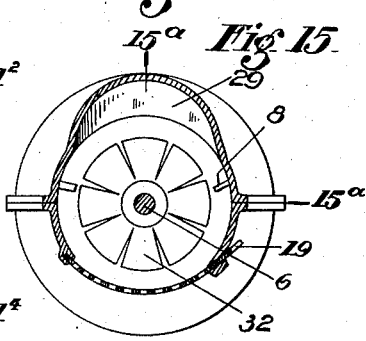
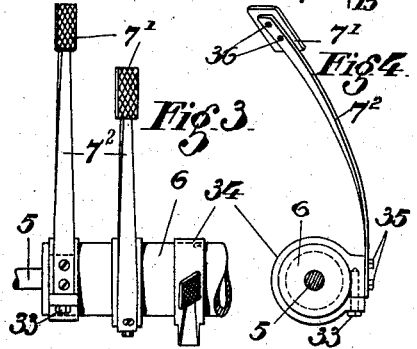
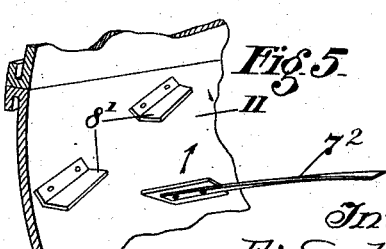

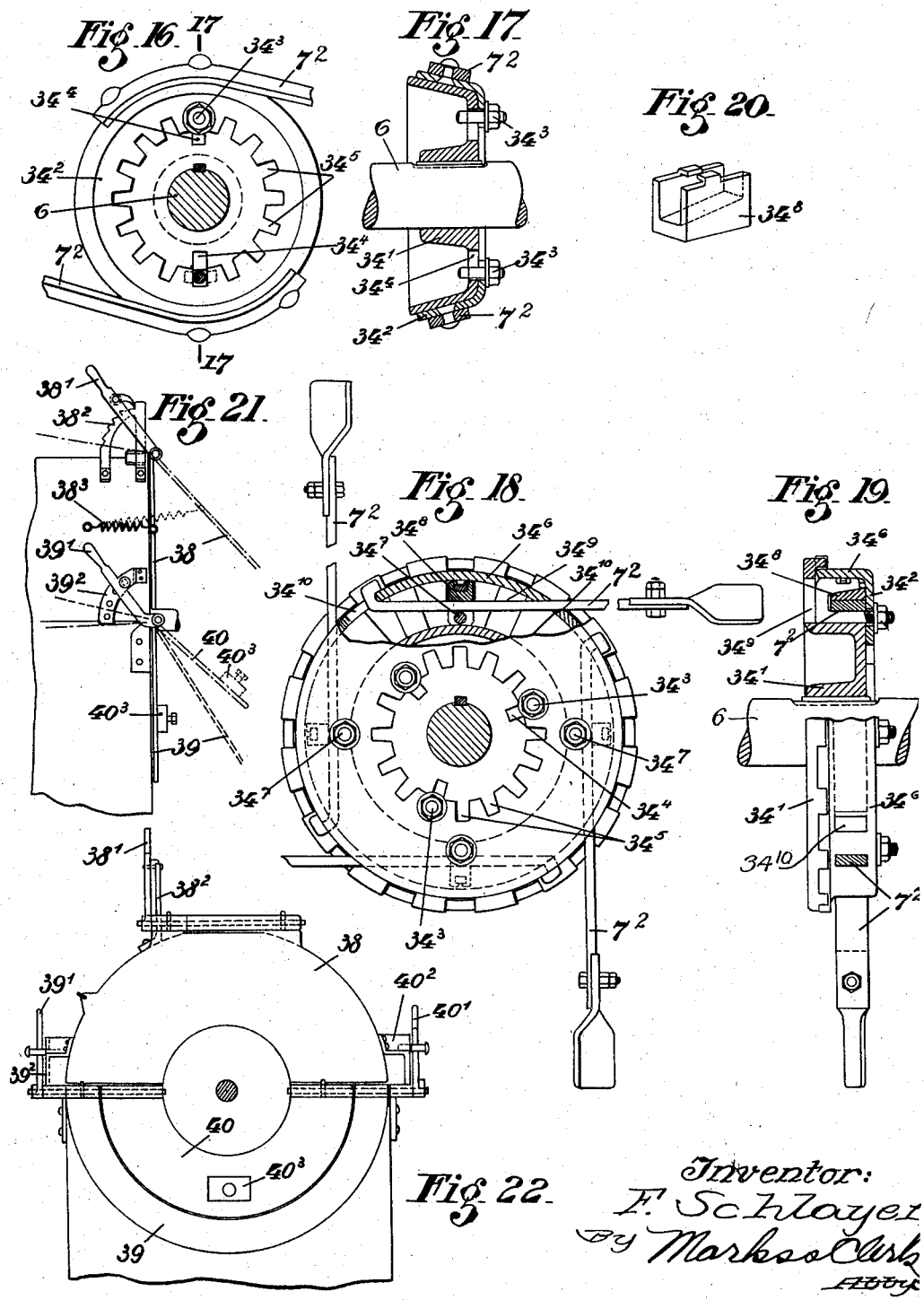

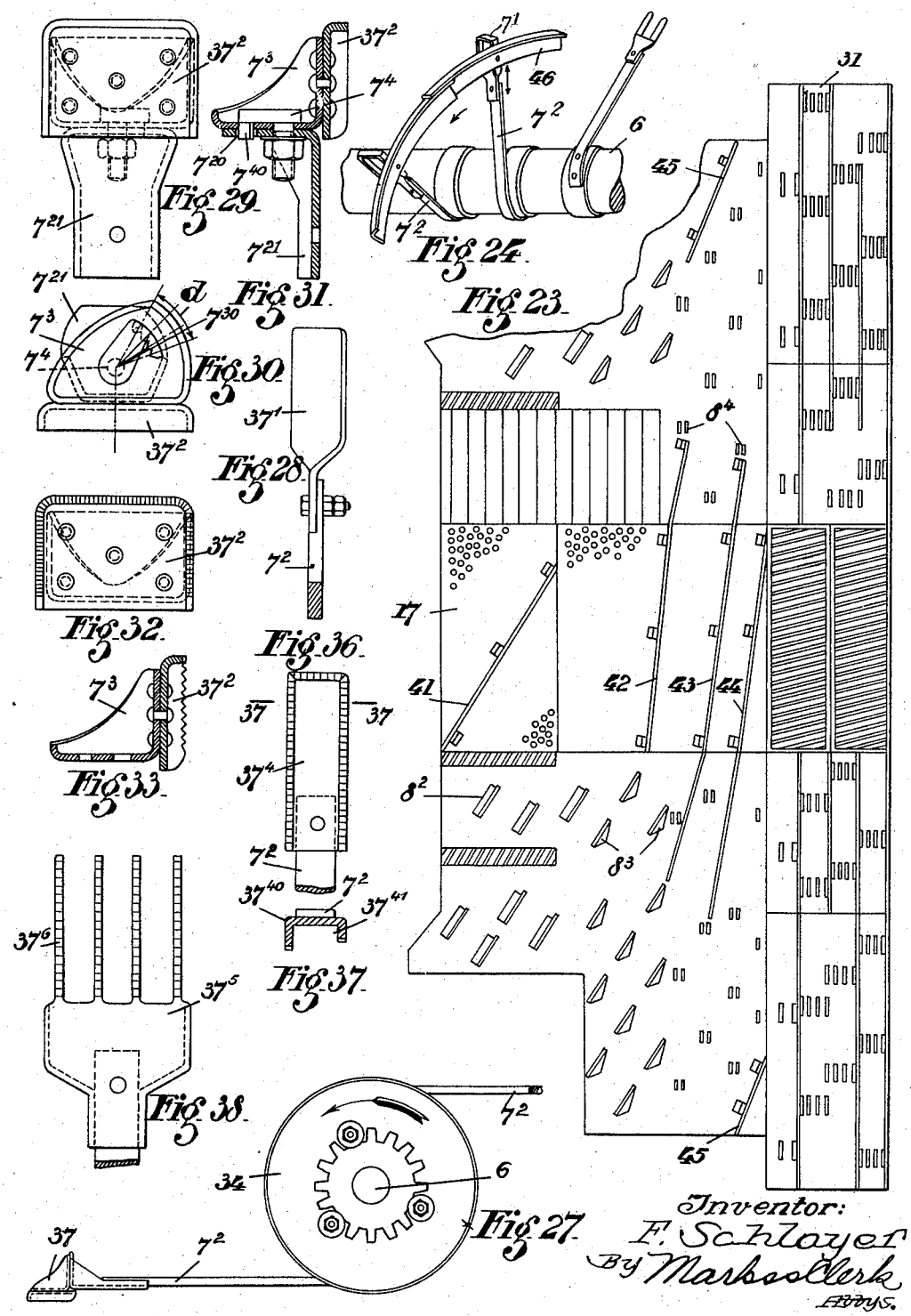

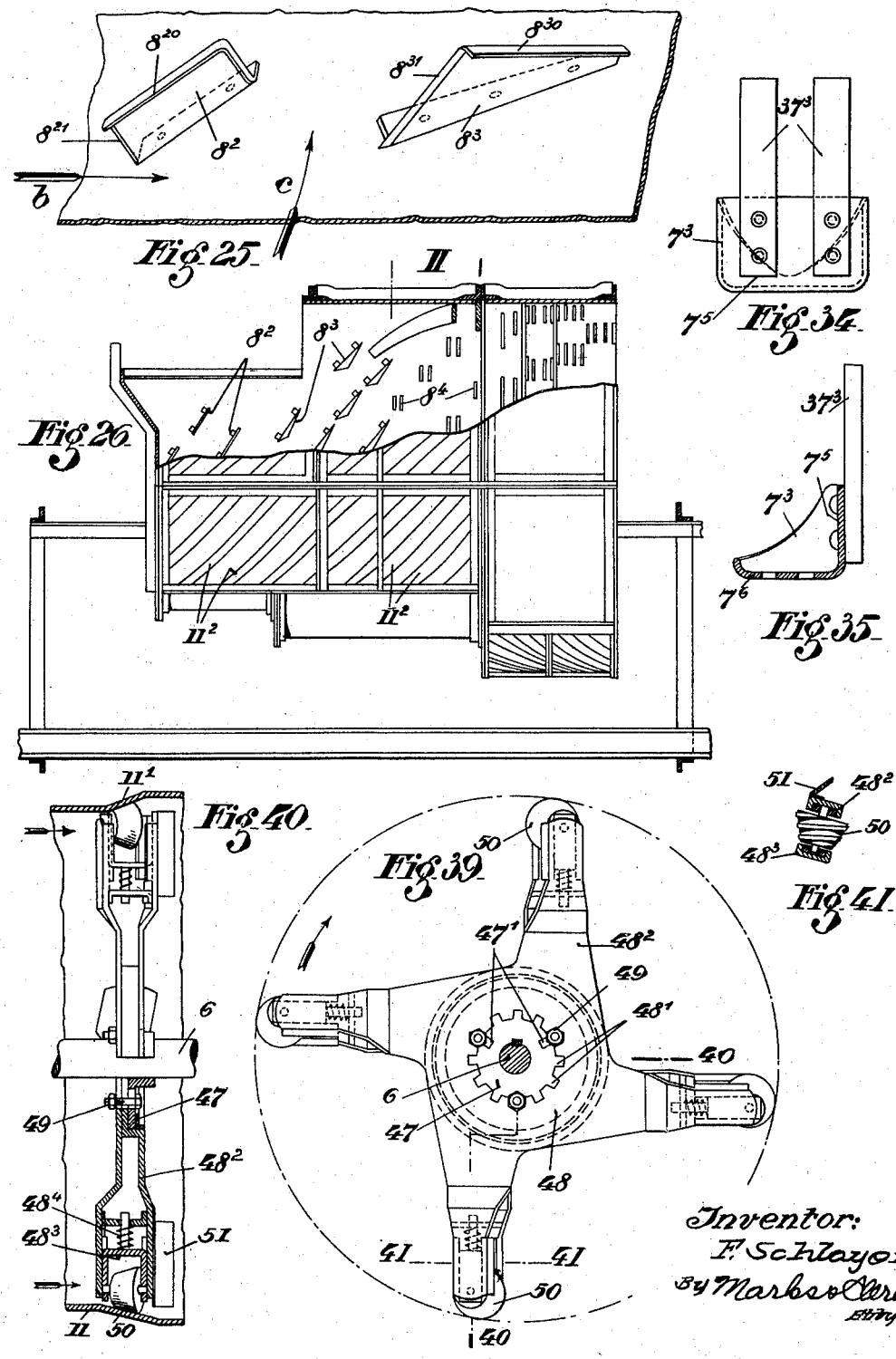

Patented Jan. 21, 1930

1,744,334

UNITED STATES PATENT OFFICE

FELIX SCHLAYER, OF MADRID, SPAIN

THRASHING MACHINE

Application filed September 13, 1923, Serial No. 662,577, and in Germany September 13, 1922. Renewed April 3, 1929.

My invention relates to improvements in thrashing machines, and more particularly in machines of the class in which the material to be thrashed is fed in a longitudinal direction through a housing and in which the thrashing apparatus proper is connected with apparatus for disintegrating and breaking up the straw. The object of the improvements is to provide a machine of this type which has a high efficiency as compared to the size of the machine and the power required for operating the same, which can be manufactured at low cost, which is simple and reliable in operation even when operated by non-experienced attendants, which permits the thrashing of materials which are different in character or in the degree of humidity, which permits of a ready regulation of the degree of thrashing, which is practically not subject to obstruction in case of an excessive supply of material, which permits the grain to be completely thrashed out, in which the loss of grain by breaking the same is small, and which permits the straw to be disintegrated, softened and broken up. With this object in view my invention consists in the matters to be described hereinafter and particularly pointed out in the appended claims.

The thrashing machines of the axial type known to the prior art do not fulfill or measure up to the recognition of theories of a thrashing operation which the inventor has reached by theoretical considerations and practical experiments. According to these, it is desired to subject the grain or sheaves, while passing through the machine, to treatment of increasing effectiveness in that it is "caught" less severely at the feeding-in end in order that the more loosely adhering grains may be detached from the heads and to insure preliminary softening of the straw, while in the further course of the treatment, more severe catching and working of the thrashing material by the revolving and stationary working members is insured, with the result that the more firmly attaching grains are loosened and removed from the heads, and that the straw is given the desired degree of softness.

These requirements are fulfilled by the invention which, among others embodied herein, has this feature that the radial distance between the drum wall and the stationary members disposed thereon, and the revolving working members is reduced toward the delivery or outlet end thereof so that, if desired, towards the last part thereof a mutual engagement or closely adjacent working of the working members takes place. The invention is extended in so far as the annular space which surrounds the revolving member at the feeding end, is made of such considerable depth that the thrashing material is ejected therefrom more or less freely, and this, in the case of dry grain, means a reduction in crushed grains, while in the case of humid or long-stalk material the danger of clogging is diminished. The scheme as here disclosed is suitably employed also in cases where the axial thrasher is designed so as to act as, or to be combined with, an axial straw comminution machine in which the depth of mutual engagement or close working between the stationary and the co-acting revolving working members increases from the feeding end in the direction of the delivery end of the machine.

From the increase in effectiveness of the revolving and the stationary working members in an axial thrasher or straw comminution (cutting or chopping) machine according to the present invention adapted to insure a methodical thrashing operation, the well-known types of machines differ in so far as in such machines as are known to the prior art that engagement between the cooperating elements takes place even at the feed end and is preserved at unchanging depth as far as the delivery end, or else that stationary members are provided only in the neighborhood of the feeding end which co-act with the revolving bodies, whereas at the posterior part of the machine, the revolving elements are moving past the smooth machine wall some distance apart. Hence, these machines are utterly devoid of all attempts at a rational adaptation of the working elements to the operation as recognized to be desirable.

Moreover it is desirable in grain thrashing machines of the axial type that an abundance of air or space is provided between the shaft and the machine housing because a large part of the thrashing material is carried by the draft or blast of air arising in the machine from the feed end towards the delivery end. This is predicted upon the fact that the outside diameter of the thrashing shaft must be compartively small in relation to the inside diameter of the housing. In order that the requisite large air space may be provided in the machine housing and yet bring the working members sufficiently close to each other to a point where they even inter-engage or overlap, arm-like beaters are arranged upon a shaft having a small diameter compared with the inside diameter of the housing.

Partly on account of these features the invention here disclosed distinguishes itself from pea thrashing machines of the axial type in which a drum is fitted over the machine shaft itself whereby the free space inside the machine is diminished to such a considerable extent that rotating bodies of only reduced length in radial direction can be employed. Other distinguishing features are that the revolving and the stationary working members are either in engagement throughout the entire length of the machine or that they do not come to make engagement at all, with the result that the rational thrashing operation or process aimed at in the present invention is not realizable.

Another important feature is that the speed of travel and therefore the intensity of treatment may be varied at will without varying the speed of rotation of the shaft, and other novel features will hereinafter appear.

For the purpose of explaining the invention several examples embodying the same have been shown in the accompanying drawings in which the same reference characters have been used in all the views to indicate corresponding parts. In said drawings,—

Fig. 1, is a longitudinal section of the machine taken on line 1—1 of the Fig. 2, Fig. 1ᵃ, is a cross-section taken on the line 1ᵃ—1ᵃ of Fig. 1, Fig. 2, is a cross-section taken on the line 2—2 of Fig. 1, Figs. 3 to 5, show details of the thrashing apparatus provided in the machine shown in Figs. 1 and 2. Fig. 3 being an elevation of a part of the thrashing shaft, Fig. 4 an end view of the thrashing shaft and showing the thrashing members mounted thereon, and Fig. 5 being a perspective view showing a part of the inner side of the wall of the housing of the thrashing machine and the stationary thrashing members secured thereto, Fig. 6, is a longitudinal section showing the main part of the housing of the machine, Fig. 7, is a partial plan view of Fig. 6 partly in section, Figs. 8 and 9, are cross-sections taken respectively on the lines 8—8 and 9—9 of Fig. 6, Fig. 10, is a perspective view showing a detail, Figs. 11, 13 and 15ᵃ, are longitudinal sections showing modifications of the housing of the thrashing machine, Fig. 15ᵃ being a section taken along the lines 15ᵃ—15ᵃ of Fig. 15.

Figs. 12, 14 and 15, are transverse sections taken respectively on the lines 12—12, 14—14 and 15—15 of Figs. 11, 13 and 15ᵃ.

Figs. 16 and 17, are respectively a cross-section taken perpendicularly to the shaft of the thrashing machine and a section taken axially of the said shaft and showing the manner of mounting the thrashing members on the said shaft, Figs. 18 and 19, are similar sectional views showing a modification of the said manner.

Fig. 20, is a perspective view showing a detail used in the construction shown in Figs. 18 and 19, Figs. 21 and 22, are respectively a partial elevation and a side view of the front end of the housing of the machine and show means for throttling the discharge of the straw, Fig. 23, is a development of the inner side of a modified form of the housing, Fig. 24, is a perspective view showing bridging means provided in connection with the movable thrashing members, Figs. 25 and 26, are respectively a plan view and an elevation partly in section showing a modification of the stationary thrashing members connected with the housing, Figs. 27 to 38, show further modifications of the movable thrashing members mounted on the machine shaft, Figs. 39 and 40, are sectional views taken respectively on a plane perpendicular to the machine shaft and along the lines 40—40 of Fig. 39 and showing means on the thrashing machine for crushing the knots of the straw, Fig. 41 is a section along the lines 41—41 of the Fig. 39 and showing detail of the said crushing means.

In the example shown in Fig. 1 my improved thrashing machine is equipped with means for disintegrating or reducing the straw and cleaning and separating the grain. As shown the machine is mounted on a truck made from iron beams 2, 9 and supported on wheels 1. The main part of the machine consists of a housing or drum 3 made from sheet metal and secured to the truck. In the example shown in Fig. 1 the housing consists of three sections I, II and III in the form of coaxial cylinders of different diameters placed one beside the other in axial direction. The first section I enclose the thrashing apparatus proper, the section III encloses the straw disintegrator, and the intermediate section II is used in part for thrashing and in part for disintegrating the straw. The top parts 3 of the said sectional housings can be independently opened. The housing 11 as a whole is divided along the horizontal median plane. The top parts 3 are hinged to the truck 2 at 12, so that they are adapted to be rocked upwardly for opening the inner parts of the housing. The top parts 3 are strengthened by angle bars 10.

Coaxially of the housing 11 a strong tubular shaft 6 of comparatively small diameter is mounted the trunnions 5 of which are supported in bearings 4 and $4^1$. The bearing 4 is supported in the end wall of the housing closing the front or inlet side thereof, and the bearing $4^1$ is mounted within an extension or channel $3^1$ of the housing, which channel is connected with the housing 3 by a hood $3^2$ including the passage $3^1$. The rear front end of the shaft 6 passes through a housing $65^4$ connected to the end wall of the housing 11 and enclosing a fan 65, and it is also supported at $4^2$ in the outer end wall of the housing $65^4$. Outside the housing three belt pulleys $6^1$, $6^2$ and $6^3$ are mounted on the shaft 6, and the pulley $6^3$ is connected with the motor (omitted for convenience in illustration) of the machine by a belt.

The thrashing members consist of two groups one of which comprises stationary members and the other one movable members. The movable members or beaters 7 are secured to the shaft 6. The stationary members or abutments $8^2$, $8^3$, $8^4$ cooperating with the movable ones are secured to the inner wall of the drum 11. In the example shown in the Figures 3 and 4 the movable thrashing members consist of thrashing tools or plates $7^1$ cooperating with the stationary members and of supports $7^2$ in the form of rods or arms. For clearness sake single arms 7 are shown in Fig. 1 and other figures. The supports $7^2$ consist of flat arms of steel secured by means of screws 35 substantially in tangential direction to rings or collars 34 adapted to be clamped to the machine shaft 6 by means of screws 33. The angular positions of the collars 34 relatively to one another is such that the ends of the arms are disposed along a helical line running around the shaft 6, the said helical line being disposed so that the successive rods $7^2$ beginning from the front or inlet end of the housing and ending at the rear or discharge end are disposed substantially at equal angles directed rearwardly in the direction of the rotation of the shaft. In other words the helical surface provided by all the beater arms is disposed in the form of a conveying worm intended to convey in the direction from the inlet end of the machine to the discharge end thereof. In addition the rods $7^2$ are helically twisted in the same sense. The operating members or plates $7^1$ removably secured to the ends of the arms by means of screws 36 are twisted and angularly disposed relatively to the shaft 6 in a similar way. The object of thus twisting the arms and disposing the beaters along a helical line is to feed the material in the direction towards the discharge end. Such feeding action is caused by the current of air produced by the helical form and also by the thrashing members acting on the material in angular direction. Preferably the beaters $7^2$ are disposed in pairs and at opposite sides of the shaft in order to balance the moving masses. In the thrashing or throwing section I to each collar 34 preferably two diametrically opposite beater arms are secured, while within the sections II and III each collar 34 carries two or more pairs of rods.

The stationary thrashing members $8^2$, $8^3$ consist of comparatively short projections secured internally to the wall of the drum 11 and directed towards the shaft. They are distributed substantially over the whole circumference of the housing excluding the bottom part thereof, the positions of the stationary members relatively to the movable members mounted on the shaft being such that as far as possible a simultaneous engagement of a plurality of movable thrashing members and stationary members is avoided. In the construction shown in the figures the movable thrashing members 7 are different in length. Within the main thrashing zone I they are so short that between their outer ends and the inner ends of the stationary thrashing members $8^2$ there is a comparatively large distance in radial direction permitting a free throwing and whirling of the material supplied at this part. Towards the discharge end of the machine the length of the movable thrashing members is increased, so that the space between the outer ends of the movable members and the stationary members $8^3$ is reduced. Near the discharge end, and particularly within the section III where mainly the straw is disintegrated or reduced the distance of the outer ends of the movable thrashing members 7 from the shaft is larger than the distance of the inner ends of the stationary members $8^4$, $37^5$, so that at the discharge end the movable thrashing members moving along the stationary members pass between the same in radial direction. In some cases the length of the movable thrashing members is gradually increased and in other cases it is increased step by step. Instead of increasing the length of the movable thrashing members the radial length of the stationary thrashing members may be increased from the inlet end of the machine to the outlet end. In other cases the thrashing members of both sets are of equal lengths, and the housing 11 carrying the stationary thrashing members 8 is reduced in diameter at the discharge end, as is indicated in Figs. 13 and 14. It is important that the radial distance between the operative parts of the movable and stationary thrashing members be reduced from the inlet end to the discharge end of the machine, and that near the inlet end where mainly the grains are thrashed out the said distance be such that a free throwing of the material is possible.

The bottom of the drum 11 is provided by plane or preferably curved sieves 17 carried by cleats 18. Particularly the sieves located near the discharge end can be readily withdrawn by means of a handle 19 shown in Figs. 12 and 15$^a$, if it is desired prematurely to interrupt the time of thrashing, which may be necessary for example if the material is very dry or brittle and is sufficiently thrashed out or disintegrated within the section II of the machine for being used as food for animals.

As appears from Figs. 12 and 14 the median parts of the sieves 17 are nearer to the shaft 6 than the other parts of the wall of the housing 11. Thereby the material is wiped by the beaters 7 over the sieves which are thereby continuously cleaned and kept free of choking matter.

By displacing the collars 34 and the beaters 7 carried thereby in circumferential direction the inclination of the helical line passing through the ends of the beaters 7 may be varied. Thereby the velocity of the material passing through the machine can be regulated and accommodated to the quality of the material. The velocity may also be changed by mounting beaters of another twist on the shaft.

The stationary thrashing members disposed within the drum 11 are preferably in the form shown in Fig. 5. They consist of cleats or short plates $8^1$ disposed obliquely to the machine shaft at such angles that they have a conveying action on the material and also guide the current of air directed towards the discharge end of the machine.

In the construction shown in the figures the movable thrashing members 7 disposed within the section II have such lengths that at the part adjacent to the inlet end they move a certain distance away from the stationary members 8, and in the part adjacent to the disintegrating or reducing zone III they slightly overlap the stationary members. The upper part of the wall of the section II of the housing is removed farther away from the shaft 6 than the remaining part of the wall 11 which is substantially cylindrical in form, as is best shown in Figs. 6 and 8. Thereby a stowing chamber 29 having an egg-shaped cross-section is provided which is adapted to take up an excessive supply of material and to keep the same until it can be thrashed after a reduction of the supply. The stowing chamber or pocket 29 extends in axial direction over the whole length of the section II. Ordinarily no stationary thrashing members are provided within the chamber 29. But in some cases I provide helically disposed guiding plates $29^1$ tending to convey the material in the direction towards the discharge of the machine. At the discharge end of the section II the stowing chamber 29 is closed as against the reducing chamber by a detachable sheet metal wall $29^2$ in the form of a sickle. By placing the said wall within the housing or dismounting the same the material passing to the reducing chamber may be retarded or accelerated. Any excess of material supplied to the machine is thrown by the thrashing members 7 mounted on the shaft 6 into the chamber 29 where it remains until the thrashing members are relieved, whereupon it falls back into the main part of the machine.

For separating the grain from the straw in a satisfactory way it is important that the grain is separated from the straw within the thrashing section I. For this purpose within the said section the free space between the path of the outer ends of the beaters 7 and the housing 11 is bounded by a corrugated wall $11^1$ so that grooves are provided which are disposed transversely of the shaft of the machine. The grain separated from the straw and moving towards the discharge end are in part thrown against the side walls of the corrugated portions of the wall 11' and they are conveyed therein to the sieves 17. Ordinarily it is sufficient to provide the corrugated wall only in that part of the drums following the sieves 17 in the direction of rotation of the thrashing members 7 and extending to the horizontal partition of the housing 11, as is shown in Figs. 7 and 8. The said part does not show any stationary thrashing members 8.

The main disintegrating or reducing chamber 31 provided by the section III consists of a plurality of separate reducing chambers $31^1$ provided by narrow flange like rings $31^2$ projecting from the wall of the housing a certain distance inwardly. The inwardly directed edges of the rings $31^2$ are provided with saw-like teeth. Within the chambers 31 there are special reducing abutments $37^5$ spaced equal distances apart and parallel to one another and having sharp edges, which members cooperate with similar disintegrating members secured to the rods $7^2$ of the rotatable shaft 6, see Figs. 36—38. The flanges $31^2$ are made with openings $31^3$ permitting the axial passage of the material from one chamber to the next one. The main reducing part 31 is larger in diameter than the sections I and II of the drum. In the construction shown in the figures the diameter of the housing III is equal to the largest diameter of the stowing pocket 29, so that the top part of pocket 29 is in alinement with the wall of the chamber 31. The chamber 29 may be closed by providing the wall $29^2$ in front of the main disintegrating chamber, in order that the material be worked before getting into the latter. In some cases the said chamber 29 may be closed nearer the inlet end of the machine in front of the chambers $31^1$, and in some cases the closing means are entirely dispensed with.

In the bottom part of the casing the straw reducing chambers $31^1$ are preferably interrupted, and in the interrupted parts a member $31^4$ in the form of a grate is provided. The passages of the grate are comparatively small so that in addition to the grain which has not yet been separated also the particles of straw which have been sufficiently disintegrated fall through the same. By forming the edges of the grate bars at the side of the shaft with saw-like teeth they provide effective disintegrating members. The grate may have any length in circumferential direction. It may be made circumferentially and axially in one or more parts, and when made in more parts the individual parts may be provided with passages of different size. Preferably the grate bars are inclined in a direction opposite to the direction of rotation of the shaft 6 so as to oppose a certain resistance to the mass of straw whirled around by the thrashing and disintegrating members. Their radial position is preferably such that the width of the discharge passages depends on the larger or smaller inclination. As appears from Figs. 6 and 7 the grate bars are preferably inclined also in a longitudinal direction relatively to the machine shaft so that they are disposed along helical lines. In the modification shown in Fig. 11 in a diagrammatical way the drum 11 is generally in the form of a continuous cylinder and it is provided internally with members 8 of equal length. In this case the bottom part of the housing provided by sieves 17 consists of three stepped sections. The median parts of the sieves are close to the paths of the outer ends of the said members. The members are stepped accordingly. Within the thrashing zone proper located near the inlet 16 the sieves are preferably spaced from the path of the working bodies, in order to keep free at this part also the bottom part of the whirling chamber.

In the modification shown in Fig. 13 the members 7 are equal in length, and the sieve 17 is disposed all over its length the same distance away from the shaft 6, while the remaining part of the housing is reduced in diameter step by step towards the discharge end.

To prevent the grain from being thrown out of the housing in axial direction the shaft 6 carries a circular disk or baffle 32 divided into sectors, as is shown in Figs. 15 and $15^a$. The parts of the said disk are connected with one another in the form of the blades of a wind mill, so that they support the movement of the straw towards the discharge directly as well as by the current of air produced thereby. The grains or seed thrown against the vaned disk 32 are thrown back into the thrashing chamber from which they are discharged through the sieves 17.

In order that the inclination of the helices formed by the movable thrashing members 7 may be readily changed I prefer to provide the constructions shown in Figs. 16 to 20. As shown in the said figures the collars carrying the rods $7^2$ are made in two sections one of which is in the form of a disc having its outer part formed into a conically shaped drum and having an inner hub member $34^1$ rigidly secured to the shaft 6, and the other one consists of a shell $34^2$ adjustably and rotatably connected with the said drum. The said parts are connected with each other by screws $34^3$ passed through radial slots $34^4$ made in the disc and which may be passed through radial slots $34^5$ of the shell $34^2$ after bringing corresponding slots into register. A large number of slots $34^5$ are provided in a radial flange of the shell $34^2$. The pitch of the slots $34^5$ is made according to a certain modulus so that the rods $7^2$ may be arranged according to helical lines of any desired number and inclination.

In the construction shown in Figs. 16 and 17 the disc carried by the hub $34^1$ and the member $34^2$ fitted thereon are in the form of cones, so that when using flat and non-twisted beaters $7^2$ the said beaters are inclined relatively to the plane passing therethrough and perpendicular to the shaft 6. Therefore twisting in the manner shown in Figs. 3 and 4 may be dispensed with.

In the modification shown in Figs. 18 to 20 the flat beaters $7^2$ are mounted on the thrashing shaft in a direction tangential thereto, and separate thrashing members are angularly mounted on the outer ends of the bars $7^2$. The rods are held as chords in a flange $34^6$ of the shell $34^2$ located concentrically to the shaft 6. The parts $34^1$ and $34^2$ are in engagement with each other in the manner of a clutch, the pitch of the claws of which corresponds to the pitch of the radial slots $34^5$. The beaters are secured in position by means of hook shaped screws $34^7$ adapted to clamp the beater bars within their hook shaped portions, wedges $34^8$ shown in detail in Fig. 20 being placed in the said hook shaped portions. The said wedge is formed with lateral flanges embracing the free arm of the hook shaped portion and engaging with noses in cut-out portions of said arm, the object of the flanges and noses being to hold the wedge in position when assembling the parts. If it is desired to dismount a bar $7^2$ the nut of the screw $34^7$ is unscrewed and the screw is removed through a hole $34^9$, of the disc $34^1$, whereupon the bar $7^2$ may be removed through a hole $34^{10}$ made in the flange $34^6$. The number of the holes $34^9$ is equal to that of the radial slots $34^5$. The shell or setting member 34² is set relatively to the disc 34¹ by unscrewing the nut from the screw 34³, shifting the screw in radial direction towards the shaft, turning the member 34² through the desired angle. moving the screw outwardly, inserting the same into the slots 34⁵ which are in register with the slots 34⁴ and screwing down the nut. The construction shown in Figs. 18–20 is preferable as compared to that previously described in that the bars 7² are not weakened at their ends subject to the highest stress, and it may also be provided in connection with conical setting members of the construction shown in Figs. 16 and 17.

In order to increase the effect of the machine the number of the helices of the movable thrashing members is preferably larger at the discharge end than at the inlet side of the machine. In the example shown in Fig. 1 the thrashing members are disposed at the inlet end in two helical rows, and the individual thrashing members are in the form of double beaters. In Fig. 1 the rods of one helix are broken away for clearness sake. In the next section II the rods are disposed along four helical rows, each hub 34 carrying two pairs of diametrically opposite rods, as is shown in Fig. 18. Ordinarily the number of the helical rows at the outlet side is an even multiple of the number of the rows at the inlet side and within the section I. By thus increasing the number of the thrashing members the material is more rapidly removed from the thrashing zone I, which results in a more rapid operation. By distributing the thrashing members on a large number of helical rows the comparatively thin mass of material exposed to the action of the individual rows is more readily worked and conveyed to the discharge side of the machine, whereby the power consumed by the machine and the danger of obstructing the same are reduced. The change of the number of the rows does not necessarily begin between the first and second sections. In some cases the change is made at another part of the machine.

For varying the time of operating on the material means are provided at the discharge end for throttling more or less the mass of distintegrated straw being discharged together with the current of air. Such means have been shown in Figs. 21 and 22 by way of example. As shown in the said figures three gates 38, 39 and 40 are provided at the discharge end, the gate 38 covering the upper section of the discharge of the machine. The gates 39 and 40 covering the lower section consists of two concentric semi-circular rings. All the gates are hinged to the housing of the machine in such a way that they can be rocked upwardly and away from the discharge. The gates can be set in partly open positions by means of arc shaped rails 38², 39² and 40². The rail 38² is formed with sprocket teeth adapted to be engaged by a pawl mounted on a hand lever 38¹ secured to the gate, and the rails 39² and 40² are formed with bores adapted to be engaged by bolts as shown. According to the desired velocity of the movement of the material the gates are opened more or less. Springs 38³ or weights 40³ are provided, which tend to close the gates. I wish it to be understood that I do not limit myself to the construction of the hinged gates, and that any other equivalent means may be provided, to establish more or less free communication of the inner of the drum with the outside. In the gates is arranged a central opening, coaxial to the beater shaft for the purpose of establishing a continuous communication of the inner of the housing with the outside. For other means for accelerating the movement of the material means such as are shown in Figs. 23 and 24 are provided. Generally speaking such means consist in bridging some of the adjacent thrashing members for directly conveying the material from the plane of one thrashing member to one of the succeeding ones. Such means may be provided in connection with the movable thrashing members or with the stationary members. Preferably they are provided at such parts of the machine where a rapid distribution of a thick mass of straw over several thrashing sections is desirable, in order to increase the effect of the machine by reducing the work of some groups of thrashing members. Preferably the bridging means are provided between the thrashing section proper and the next section provided in front of the disintegrating section.

In the construction shown in Fig. 23 the bridging members consist of strips 41, 42, 43, 44 and 45 removably secured to the inside of the circumferential wall of the housing, which strips are preferably adapted to be set in different positions and to be replaced by guiding members of other form. As shown in the figure the said strips are disposed angularly of the longitudinal axis of the housing, and their angular position depends on the desired velocity of the movement of the straw. Preferably the strips are disposed along helices corresponding to the helical arrangement of the stationary thrashing members. Within the first or thrashing section 1 of the housing there is a bridge member 41 which is substantially parallel to the rigid plate members 8², and which is adapted to convey a part of the material from the said thrashing section directly to a part near the rigid plate members 8³ of the section II. As shown the strip 41 is provided on the sieve 17 which is the preferred construction. The bridging or guiding member 42 begins substantially at the middle of the first group 8³ of the stationary members disposed within the section II, which group consists of two rows, and it ends at the first circumferential row of the stationary members of the group $8^4$. By this bridge and by the strips 44 bridging the next three of the rows $8^4$ of stationary members the straw is conveyed from the thrashing section I to the end of the section II, from whence it is conveyed by the bridge members 44 and 45 into the main disintegrating chamber 31. By disposing the bridge members 41 to 44 above the sieves the grains are not carried along and to the discharge by the current of air flowing through the housing.

The means for bridging the movable thrashing members are in the form of narrow segments 46 secured to the beaters $7^2$ or, as is shown in Fig. 24, to the thrashing members $37^1$ themselves which are secured to the ends of the bars $7^2$. The outer margin of the segments 46 is formed with a flange directed laterally and towards the discharge of the machine. Therefore, the straw projecting inwardly from the stationary thrashing members is gripped and carried away, the segments having an action similar to that of a shovel. Preferably the bars $7^2$ are made with spring action and adjustable on the shaft 6 in the direction of the circumference. In this case the bridging members cooperating with two rods are made in two sections, the adjacent ends of the said sections overlapping each other. If the segment extends over more than two rods it is subdivided accordingly. The bridging members are preferably provided in the section II of the housing where disintegration of the straw is started, and the number of the helical members depends on the result aimed at. By displacing the same in radial direction, as is indicated in Fig. 24 by a double arrow their effect may be varied. If the thrashing members $7^1$ are radially adjustable on their carriers $7^2$, the bridge members secured thereto are displaced together therewith.

The effect of the stationary members or abutments secured in angular positions to the wall of the housing may be considerably improved by constructing the same in the form shown in Fig. 25, in which a part of the drum wall and two members are illustrated. The members are in the form of plates $8^2$ and $8^3$ having at two sides comparatively low flange-like side walls $8^{20}$ and $8^{30}$ respectively, while the front margins $8^{21}$ and $8^{31}$ respectively taken in the direction of the movement of the movable thrashing members are not provided with side walls, but are provided with sharp edges, in order that the material moving in the direction of the arrow $b$ may find only a small resistance. In the members $8^3$ located at the delivery side of the section of the housing the breadth of the bottom of the trough is gradually reduced from the inlet side to the delivery side, whereby thrashing is made more effective. At the reduced end of the member $8^3$ and also at the corresponding end of the member $8^2$ side walls $8^{30}$ and $8^{20}$ respectively may be dispensed with. The arrow $c$ indicates the direction of the rotation of the thrashing members carried by the shaft. By the low side walls $8^{20}$ and $8^{30}$ the thrashing action is considerably improved, because the ears thrown against the same are stripped off. The side walls hold the separated grains back as against the straw and conduct the same to the wall of the housing. Furthermore by the construction of the stationary members the material and the air are conducted through the machine in a better way. In order to vary the action of the said members according to the character of the material, they are removably and adjustably mounted, so that members of the most appropriate form may be provided. For this reason the members are secured to the wall of the housing by bolts which may be readily removed, and the wall of the housing is provided with a plurality of holes for the passage of the bolts therethrough and for fixing the members in the proper positions. As appears from Fig 26 the stationary members $8^2$ and $8^3$ are ordinarily disposed along helical lines the axis of which coincides with that of the machine shaft. To provide a strong support for the bolts securing the members $8^2$ and $8^3$ to the wall of the housing I prefer to secure helical metal bars $11^2$ to the outside of the circumferential wall of the housing, which bars are disposed in the desired positions and provided with holes for the passage of the bolts therethrough. Similar bars $11^2$ are provided for fixing the members $8^4$ to the wall of the section II of the housing, which bars, however, are a little broader than the bars provided in the section I.

The twisting of the bars carrying the thrashing members is in a certain degree objectionable at such parts of the machine where the thrashing members pass between the stationary thrashing members. In case of high load the beaters yield in lateral direction, so that their ends are liable to strike against the stationary members and to cause destruction of parts of the machine. For this reason I prefer to construct the beaters in the form of non-twisted bars and preferably in the form of flat iron bars which when made of elastic material are mounted so as to yield only within planes perpendicular to the axis of the machine, the twist being provided in the working members mounted on the bars. Within the thrashing chamber the said working members are preferably in the form of caps or shoes and disposed in angular positions to the shaft. They act as scoops for supporting the feeding and conveying of the material by drawing in air by suction through the inlet and carrying the same away.

The thrashing members proper are preferably adjustably secured to the bars. Therefore by changing the angular position of the thrashing members the thrashing and conveying effect can be varied. The thrashing members may also be replaced by other ones. preferably towards the discharge end the working members are set so that the angles between the machine shaft and planes perpendicular to the machine shaft are gradually reduced. Figs. 27 to 38 show various examples of thrashing and reducing members. Fig. 27 shows a pair of thrashing beaters mounted in the manner referred to on a common hub 34, the carrying members $7^2$ being in the form of flat metal bars and having a thrashing member 37 in the form of a shovel secured thereto. If in a member thus constructed in two parts twisting is required, the twist is made in the tool 37 itself. In the example shown in Fig. 28 this is done by providing a thrashing member in the form of an angularly mounted plate $37^1$.

In the modification shown in Figs. 29 to 31 the tool is in the form of a shovel or cap $37^2$. Tools of this construction are preferably provided within the section I of the housing of the machine near the inlet end thereof, in order to produce a sucking action for drawing the air through the inlet. Also within the section II tools in the form of caps may be provided, the construction of which is shown in Figs. 32 and 33. As shown the edges of the caps are serrated. In the construction shown in Figs. 29 to 31 the means for varying the inclination of the tool consist of a shoe $7^{21}$ secured to the free end of the bar $7^2$. The shoe is formed with a plate projecting laterally from the bar and supports a tool carrier $7^3$ secured to the tool $37^2$ mounted thereon. For removably connecting the shoe $7^{21}$ and the carrier $7^3$ a hook shaped screw $7^4$ is provided the nose $7^{40}$ of which is adapted to be passed from above into either one of a plurality of notches $7^{30}$ of the carrier $7^3$ and into a hole $7^{20}$ of the shoe $7^{21}$. The angle through which the tool may be displaced from the position shown in Fig. 30, in which it is parallel to the bar $7^2$ has been indicated by an arrow $d$.

In Figs. 34 and 35 I have shown tools such as are preferably used in connection with the rods $7^2$ within the intermediate chamber II. They consist of members in the form of caps $7^3$ having angular cross-sections and carrying at one shank $7^5$ two prongs $37^3$ projecting therefrom in the form of fingers, while the bottom part $7^6$ is used for securing the cap to the bar $7^2$ in the manner described with reference to Figs. 29 to 31.

In the modification shown in Figs. 36 and 37 of which Fig. 37 is a section along the lines 37—37 of the Fig. 36 the tool $37^4$ is formed with saw-like edges, the lateral walls $37^{40}$ and $37^{41}$ located parallel to the rotary direction of the bar $7^2$ being different in height. Preferably the said tool is used within section II in which disintegration is started and within the first part of the main reducing section III.

In Fig. 38 I have shown a tool $37^5$ which is equipped at the operative side with a plurality of indented members $37^6$ in the form of fingers, which tool is used within the main disintegrating chamber III and cooperates with stationary members $37^5$ consisting of saw sections having their teeth directed towards the shaft. Preferably the said members are mounted perpendicularly to the wall of the housing. For improving the disintegrating capacity of the said members, and more particularly the crushing of the knots of the blades I prefer to mount the apparatus shown in Figs. 39 to 41 within the thrashing machine, and preferably at the part intermediate the sections II and III. The said means comprise a hub 47 secured to the shaft 6 of the machine, and a carrying member 48 having four tangential arms $48^2$ and adjustably secured to the hub by means of screws 49 passing through slots $47^1$ of the hub and radial slots $48^1$ of the carrier, as has been described with reference to Figs. 16 to 19.

The said tangential arms are bifurcated at their ends, and in the bifurcated ends radially movable shoes $48^3$ are mounted which are supported at the side of the shaft 6 on springs $48^4$ and carry each a conical roller 50 preferably made from light metal. The rollers move within a plane perpendicular to the shaft 6 and on a guide rail $11^1$ arranged to the inner side of the wall 11. The bearing surface of the said rail is conical in shape according to the conical form of the rollers. The reduced ends of the rollers are at the side of the inlet end of the machine, and their axes are disposed angularly of the machine shaft, according to the twist of the thrashing members, in order to facilitate the passage of the material. For the same purpose a wiper 51 in the form of a flange is provided at the arms $48^2$. The material arriving in the direction of the arrows (Fig. 40) is thrown by the arms $48^2$ on the circumferential race $11^1$ of the rollers and crushed by the rollers acted upon by the springs $48^4$ or by the centrifugal action. In addition to the means referred to, the movement of the material in axial direction may be further assisted by providing the rollers with helical grooves (Fig. 41).

The crushing means may be provided at any suitable part of the length of the housing of the machine. Preferably the rollers 50 consist of hollow bodies filled with oil or another suitable lubricant. The helical grooves of the rollers are made for example by spirally winding two strips of leather or metal of different heights on the bodies of the rollers (Fig. 41).

The springs 48⁴ may be utilized for assisting and regulating the crushing power of the rollers and are diagrammatically illustrated, the details being omitted for convenience.

For collecting the grain which might be carried away with the straw discharged from the machine a conveying and agitating apparatus 52 is provided at the discharge end of the machine, as is shown in Figs. 1 and 1ᵃ. As shown the conveying and agitating apparatus comprises an inclined drum 52⁰ rising from the bottom part of the hood 3². The bottom of the drum 52⁰ consists of a sieve 52¹. Below the latter there is a channel 52² for collecting the grain falling through the sieve 52¹ and returning the same over a trough 52⁵ to the grain cleaning apparatus. Within the drum there is a rotary shaft 54 carrying blades 54¹ providing a worm. The shaft may be driven from the main shaft 6 of the machine by a belt 54⁰ and a flexible shaft 54² made in sections connected by universal joints. In front of the inlet to the drum 52 a trough 52³ is provided which takes up the straw coming from the disintegrating apparatus, and which extends to a point below the end 31 of the machine constructed in the form of a grate 31⁴ and foraminated to provide a sieve, in order that the grain passing through the grate may be directly separated.

In the operation of the machine the disintegrated straw falls through the grate 31⁴ or through the outlet 48 provided at the end of the section III into the trough 52³ of the drum 52, the drum being disposed sidewise of the median vertical plane passing through the machine. The straw is caught by the helical blades 54¹ and whirled around within the drum. Thereby the particles of the disintegrated straw are made loose, so that the grains are effectively separated. The separated grains pass through the sieve 52¹, the channel 52² and the trough 52³ to the main sieve 61¹, while the straw is conveyed to the top end of the drum, from which it is discharged through the outlet 52⁴. Below the said outlet a car may be placed.

The current of air coming from the machine may be used for separating the grain collected within the channel 52² from the light particles of straw. In a preferred construction the channel is connected with the discharge 52⁴, so that a current of air is produced from the discharge end of the machine through the bottom part of the sieve 52¹ adjacent to the trough 52³ and into the channel 52², wherein it flows to the discharge 52⁴, thus carrying away the light particles of straw.

Furthermore the current of air produced by the thrashing members may be used to move the whole mass of disintegrated straw coming from the machine in the desired direction, for example for loading a vehicle, the invention broadly consisting in using the said current of air for operating any air current consumers.

To adapt the discharge 52⁴ from the drum to the height of the car the shaking or conveying apparatus is preferably rockingly mounted. I wish it to be understood that my improved shaking and conveying apparatus may also be used in thrashing machines of other types.

While in describing the invention reference has been made to particular examples embodying the same I wish it to be understood that my invention is not limited to the constructions shown in the drawings, and that various changes may be made in the general arrangement of the apparatus and the construction of its parts without departing from the invention. Furthermore I do not limit myself to the use of the cleaning apparatus in thrashing and disintegrating machines such as are described herein, and it may be used in thrashing machines of other types.

I claim:

1. A thrashing machine, comprising a housing having an inlet and an outlet for the material to be thrashed, a rotary shaft extending within said housing from said inlet to said outlet, two cooperating groups of working members one stationary and the other one movable with and mounted on said shaft, said stationary and rotary members being adapted to enter into more and more close co-operation towards the outlet end of the machine, a part of said stationary working members forming ledges obliquely disposed with regard to said shaft, and means for rotating said shaft.

2. A thrashing machine, comprising a substantially cylindrical housing, a rotary shaft within said housing, cooperating thrashing devices carried by the housing and the shaft and adapted to carry the material to be thrashed in an axial direction through said housing, the bottom part of said housing having a plurality of removable sieves adjacent to one another in axial direction, for collecting the thrashed out material at any point in the axial direction.

3. An axial thrashing machine, comprising a housing having an inlet and an outlet, a rotary shaft within said housing and extending in the direction from said inlet to said outlet, stationary working members secured to said housing, rotatable working members mounted on said shaft in a helical line, said stationary and rotary members being adapted to enter into more and more close co-operation towards the outlet end of the machine, said rotatable members being circumferentially adjustable on said shaft, and means for rotating said shaft.

4. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, the inner ends of the stationary working members near the inlet end of said housing being radially spaced from the outer ends of the movable members, the outer end portions of the movable members nearer to the outlet end of the housing overlapping the inner end portions of the stationary members, means for circumferentially adjusting said movable members on said shaft, and means for rotating said shaft.

5. An axial thrashing machine, comprising a housing having an inlet and an outlet, a rotary shaft within said housing and extending in the direction from said inlet to said outlet, stationary workng members secured to said housing, twisted rotatable working members interchangeably mounted on said shaft in a helical line and said stationary working members being positioned and constructed to cooperate with rotatable working members of different twist and propelling effect, the radial distances of the inner ends of said stationary members from the outer ends of said rotatable members decreasing in the direction toward the outlet.

6. A thrashing machine comprising a housing having a bottom part and a top part separate therefrom, said top part subdivided into a plurality of single parts independent from each other, some of said single parts being hinged to said bottom part to permit swinging over laterally of the shaft thereof, said housing having an inlet and an outlet, a rotatable shaft within said housing, stationary working members, rotatable working members mounted on said shaft.

7. A thrashing machine comprising an elongated housing having an inlet and an outlet, a rotatable shaft within said housing, stationary working members on said housing, rotatable working members mounted on said shaft and cooperating with said stationary members, the upper part of said housing adjacent the inlet having a bulged or enlarged part to provide a chamber for the reception of an excess amount of material introduced into the inlet, and means for rotating said shaft.

8. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, said stationary and rotary members being adapted to enter into more and more close co-operation towards the outlet end of the machine, at least some of said movable members comprising an arm and a tool near the outer end of said arm, and means for rotating said shaft.

9. An axial thrashing machine, comprising a housing having an inlet and outlet for the material to be thrashed, a rotary shaft extending within said housing from said inlet to said outlet, two cooperating groups of working members one stationary and the other one movable with and mounted on said shaft, at least some of said movable members comprising an arm and a tool detachably secured to said arm near its outer end, and means for rotating said shaft.

10. A thrashing machine, comprising a housing having an inlet and an outlet for the material to be thrashed, a rotary shaft extending within said housing from said inlet to said outlet, two cooperating groups of working members one stationary and the other one movable with and mounted on said shaft, the inner ends of the stationary working members near the inlet end of said housing being radially spaced from the outer ends of the movable members, the outer end portions of the movable members nearer to the outlet end of the housing overlapping the inner end portions of the stationary members, said overlapping increasing towards said outlet end, at least some of said movable members comprising an arm and a tool near the outer end of said arm, and means for rotating said shaft.

11. A thrashing machine, comprising a housing having an inlet and an outlet for the material to be thrashed, a rotary shaft extending within said housing from said inlet to said outlet, two cooperating groups of working members one stationary and the other one movable with and mounted on said shaft, the inner ends of the stationary working members near the inlet end of said housing being radially spaced from the outer ends of the movable members, the outer end portions of the movable members nearer to the outlet end of the housing overlapping the inner end portions of the stationary members, said overlapping increasing towards said outlet end, at least some of said movable members comprising an arm and a tool detachably secured to said arm near its outer end, and means for rotating said shaft.

12. An axial thrashing machine, comprising a housing having an inlet and an outlet for the material to be thrashed, a rotary shaft within said housing, elongated operating members mounted tangentially on said shaft and extending therefrom towards the circumferential wall of said housing, at least some of said elongated members comprising an arm and a tool at the outer end of said arm, stationary operating members disposed in position for cooperation with said elongated members or tools and means for rotating said shaft.

13. A thrashing machine, comprising a housing having an inlet and an outlet for the material to be thrashed, a rotary shaft within said housing, rotary operating members mounted on said shaft and comprising elastic arms at least some of said elastic arms having a tool near the outer end, stationary operating members in position for cooperation with said rotary members, said elastic arms being yieldable in planes transverse to the shaft, and means for rotating said shaft.

14. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, a circumferentially continuous free space between the inner ends of the stationary members and the outer ends of the movable members near the inlet end of the housing, said housing forming a part of enlarged cross-section intermediate its ends providing a chamber adapted to take up an excessive supply of material, and means for rotating said shaft.

15. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, a circumferentially continuous free space between the inner ends of the stationary members and the outer ends of the movable members near the inlet end of the housing, said housing forming a part of enlarged oval cross-section intermediate its ends providing a chamber communicating with said free space and adapted to take up an excessive supply of material, and means for rotating said shaft.

16. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, said housing forming a part of enlarged cross-section intermediate its ends providing a chamber adapted to take up an excessive supply of material, guiding ledges within said chamber angularly disposed relatively to said shaft, and means for rotating said shaft.

17. A thrashing machine, comprising a housing having an inlet and an outlet for the material to be thrashed, a rotary shaft within said housing extending from said inlet to said outlet, rotary thrashing members mounted in said shaft, stationary cooperating thrashing members on the housing, circumferential parts of said housing being formed with corrugations, and means for rotating said shaft.

18. In a thrashing machine having a housing comprising a top part and a bottom part, means for the passage of the grain from said housing, a rotary shaft within said housing, rotary thrashing means mounted on said shaft, stationary co-operating devices carried by the housing, parts of the wall of said housing adjacent to said passage means and extending up to said top part being formed with corrugations extending in a circumferential direction, and means for rotating said shaft.

19. In an axial thrashing machine a housing having an inlet and an outlet end, stationary working members mounted on the interior of said housing, a rotary shaft, rotary working members mounted on said shaft, flange-like partitions radially extending from the peripheral wall of said housing near said outlet end, said partitions separating groups of said stationary members from each other, and means for rotating said shaft.

20. A thrashing machine, comprising a housing having an inlet and an outlet for the material to be thrashed, thrashing means at the inlet side of the housing, disintegrating means at the outlet side thereof, means for preparing disintegration intermediate said thrashing and disintegrating means, a stowing chamber above said thrashing and preparing means, a disintegrating chamber enclosing said disintegrating means, the top walls of said stowing chamber and of said disintegrating chamber being substantially in alignment.

21. A thrashing machine, comprising a housing having an inlet and an outlet for the material to be thrashed, thrashing means at the inlet side of the housing, disintegrating means at the outlet side thereof, means for preparing disintegration intermediate said thrashing and disintegrating means, a stowing chamber above said thrashing and preparing means, a disintegrating chamber enclosing said disintegrating means, the top walls of said stowing chamber and of said disintegrating chamber being substantially in alignment, and a detachable partition between said stowing chamber and said disintegrating chamber.

22. In an axial thrashing machine having an inlet and an outlet end, stationary working members, a rotary shaft, rotary working members mounted on said shaft, the radial distances of the inner ends of said stationary members from the outer ends of said rotary members decreasing in the direction toward the outlet end of the machine, flange-like partitions radially extending from the peripheral wall of said housing near said outlet end, said partitions separating single groups of said stationary members from each other, a part of the peripheral wall of said housing forming a grate, the inwardly directed edges of the bars of said grate provided with saw-like teeth, and means for rotating said shaft.

23. An axial thrashing machine, comprising a housing having an inlet and outlet for the material to be thrashed, a rotary shaft extending within said housing from said inlet to said outlet, two cooperating groups of working members one stationary and the other one movable with and mounted on said shaft, a circumferentially continuous free space between the inner ends of the stationary members and the outer ends of the movable members near the inlet end of the housing, a part of the wall of said housing being formed with sieve like openings, that at least part of said space lying opposite said sievelike part of the housing being reduced in radial depth, and means for rotating said shaft.

24. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, a circumferential free space between the inner ends of the stationary members and the outer ends of the movable members near the inlet end of the housing, and sieves disposed at the bottom of the housing and arranged close to the paths of the movable working members and forming in effect the lower portion of the drum.

25. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, a circumferential free space between the inner ends of the stationary members and the outer ends of the movable members near the inlet end of the housing, the bottom wall of said housing being perforated, the radial distance of said perforated wall from said shaft increasing from the inlet to the outlet end, the radial distances of the outer ends of said movable members from said shaft increasing from the inlet to the outlet end, and means for rotating said shaft.

26. An axial thrashing machine, comprising a housing having an inlet and an outlet for the material to be thrashed, a rotary shaft extending within said housing from said inlet to said outlet, two cooperating groups of working members one stationary and the other one movable with and mounted on said shaft, a circumferential free space between the inner ends of the stationary members and the outer ends of the movable members near the inlet end of the housing, the bottom wall of said housing comprising perforated members in the form of curved sections disposed eccentrically to said shaft.

27. A thrashing machine, comprising a housing having an inlet and an outlet for the material to be thrashed, a rotary shaft extending within said housing from said inlet to said outlet, two cooperating groups of working members one stationary and the other one movable with and mounted on said shaft, a baffle disc on said shaft, subdivided into sectors, said sectors being helically deflected, and means for rotating said shaft.

28. A thrashing machine comprising a housing having an inlet and an outlet, a rotary shaft within said housing, ring bodies or hub structures mounted at intervals on said shaft, a shell adapted to be secured to each ring body, elongated thrashing members secured tangentially to said shell, said shell being circumferentially adjustable upon the ring bodies so as to readily vary the relative positions of the rotary operating members and means for rotating said shaft.

29. A thrashing machine, comprising a housing having an inlet and an outlet, a rotary shaft within said housing, stationary operating members, cone-shaped ring bodies mounted on said shaft, bar-like rotary operating members tangentially secured to said ring bodies, and means for rotating said shaft.

30. A thrashing machine, comprising a housing having an inlet and an outlet, a rotary shaft within said housing, stationary operating members, rotary operating members secured to said shaft and being disposed along it in helical lines, the pitch of said helical lines being smaller near the outlet than near the inlet end of the housing, the radial distances of the inner ends of said stationary members from the outer ends of said rotary members decreasing from the inlet to the outlet of the housing, and means for rotating said shaft.

31. A thrashing machine, comprising a housing having an inlet and an outlet, a rotary shaft within said housing stationary operating members extending inwardly from said housing, rotary operating members mounted on said shaft, said stationary and rotary members being adapted to enter into more and more close co-operation towards the outlet end of the machine, means near the outlet to establish more or less free communication of the interior of said housing with the exterior thereof, and means for rotating said shaft.

32. An axial thrashing machine, comprising a housing having an inlet and an outlet, a rotary shaft within said housing, stationary operating members extending inwardly from said housing, rotary operating members mounted on said shaft, said stationary and rotary members being adapted to enter into more and more close co-operation towards the outlet end of the machine, a central opening in said housing at its outlet end, coaxial to said shaft and establishing continuous communication of the inner of the housing with the outside, and means for rotating said shaft.

33. An axial thrashing machine, comprising a housing having an inlet and an outlet, a rotary shaft within said housing, stationary operating members extending inwardly from said housing, rotary operating members mounted on said shaft, said stationary and rotary members being adapted to enter into more and more close co-operation towards the outlet end of the machine, helically disposed guiding members bridging adjacent operating members so as to propel the materials towards the discharge end of the machine, and means for rotating said shaft.

34. An axial thrashing machine, comprising a housing having an inlet and an outlet, a rotary shaft within said housing, stationary operating members extending inwardly from said housing, rotary operating members mounted on said shaft, helically disposed guiding members bridging adjacent operating members so as to propel the materials towards the distributing end of the machine, said guiding members being mounted on the housing independently from said stationary members, and means for rotating said shaft.

35. An axial thrashing machine, comprising a housing having an inlet and an outlet, a rotary shaft within said housing, stationary operating members extending inwardly from said housing, rotary operating members mounted on said shaft, helically disposed guiding members secured to said rotary members, and means for rotating said shaft.

36. An axial thrashing machine, comprising a housing having an inlet and an outlet, a rotary shaft within said housing, stationary operating members extending inwardly from said housing, rotary operating members mounted on said shaft and comprising each an arm and a working piece on said arm, guiding members connected to said working pieces so as to bridge adjacent rotary operating members and to form propelling elements for the materials, and means for rotating said shaft.

37. An axial thrashing machine, comprising a housing having an inlet and an outlet, a rotary shaft within said housing, stationary operating means comprising flat bodies disposed angularly relatively to said shaft and extending radially from said housing, said bodies having low flange-like side walls, rotary operating means mounted on said shaft, and means for rotating said shaft.

38. A thrashing machine, comprising a housing, having an inlet and an outlet, a rotary shaft within said housing, stationary operating members, rotary operating members mounted on said shaft, and comprising a supporting arm in form of a flat bar and a working body in form of a plate having low side rims secured to said bar, said body being angularly disposed relatively to said shaft, and means for rotating said shaft.

39. An axial thrashing machine, comprising a housing, having an inlet and an outlet, a rotary shaft within said housing, stationary operating members, rotary operating members mounted on said shaft, some of said rotary members comprising a supporting arm and a cap-like working body on said arm, the side walls of said cap-like working body having different heights, and means for rotating said shaft.

40. A thrashing machine, comprising a housing, having an inlet and an outlet, a rotary shaft within said housing, stationary operating members, rotary operating members mounted on said shaft, some of said rotary members comprising a supporting arm and a working body on said arm, said working body comprising a plurality of disintegrating fingers having serrated edges facing direction of rotation, and means for rotating said shaft.

41. A thrashing machine, comprising a housing having an inlet and an outlet, a rotary shaft within said housing, stationary operating members some of said stationary members comprising a plurality of disintegrating fingers, rotary operating members mounted on said shaft, some of said rotary members comprising a supporting arm and a working body on said arm, said working body comprising a plurality of disintegrating fingers, and means for rotating said shaft.

42. A thrashing machine, comprising a housing having an inlet and an outlet, a rotary shaft within said housing, stationary operating members, rotary operating members mounted on said shaft, some of said rotary members comprising an arm and a crushing roller mounted on said arm, a rolling path provided on the inner side of said housing, said rollers adapted to roll on said path, and means for rotating said shaft.

43. A thrashing machine, comprising a housing having an inlet and an outlet, a rotary shaft within said housing, stationary operating members, rotary operating members mounted on said shaft, some of said rotary members comprising an arm and a radially movable and spring actuated supporting member on said arm, a crushing roller mounted on said supporting member, a rolling path provided on the inner side of said housing, said rollers adapted to roll on said path, and means for rotating said shaft.

44. A thrashing machine, comprising a housing having an inlet and an outlet, a rotary shaft within said housing, stationary operating members, rotary operating members mounted on said shaft, some of said rotary members comprising an arm and a conical crushing roller mounted on said arm, a conical rolling path provided on the inner side of said housing, said rollers adapted to roll on said path, and means for rotating said shaft.

45. A thrashing machine, comprising a housing having an inlet and an outlet, a rotary shaft within said housing, stationary operating members, rotary operating members mounted on said shaft, some of said rotary members comprising an arm and a crushing roller mounted on said arm and rotatable about an axis angularly disposed relatively to said shaft, a rolling path provided on the inner side of said housing, said rollers adapted to roll on said path, and means for rotating said shaft.

46. An axial thrashing machine, comprising a housing having an inlet and an outlet, a rotary shaft within said housing, stationary thrashing members, bars mounted on said shaft, and extending therefrom towards said housing, the flat sides of said bars forming angles relatively to the axis of said shaft, said bars being so numerous and their operative faces being of such width that an air current of considerable strength is caused to pass the housing of the machine, whereby after the thrashing operation said air current may be utilized in a device for subsequent treating the material leaving the machine.

47. An axial thrashing machine, comprising a housing having an inlet and an outlet, a rotary shaft within said housing, stationary thrashing ledges angularly disposed relatively to said shaft, bars mounted on said shaft and extending therefrom towards said housing, the flat sides of said bars forming angles relatively to the axis of said shaft, said bars and said ledges being so numerous and their operative faces being of such width that an air current of considerable strength is caused to pass the housing of the machine, whereby after the thrashing operation said air current may be utilized in a device for preliminary cleaning of grain separted by a device for conveying the disintegrated straw.

48. An axial thrashing machine, comprising a housing having an inlet and an outlet, a rotary shaft within said housing, stationary thrashing ledges angularly disposed relatively to said shaft, bars mounted on said shaft and extending therefrom towards said housing, the flat sides of said bars forming angles relatively to the axis of said shaft, said bars and said ledges being so numerous and their operative faces being of such width that an air current of considerable strength is caused to pass the housing of the machine, whereby after the thrashing operation said air current may be utilized in a device for preliminary cleaning of grain separated by a device for conveying the disintegrated straw, said conveying device comprising a drum, a conveying whirling roll within said drum, the bottom part of said drum being perforated, a grain collecting channel arranged beneath said bottom part and being passed by said air current.

49. An axial thrashing machine, comprising a housing having an inlet and an outlet, a rotary shaft within said housing, stationary thrashing ledges angularly disposed relatively to said shaft, bars mounted on said shaft and extending therefrom towards said housing, the flat sides of said bars forming angles relatively to the axis of said shaft, said bars and said ledges being so numerous and their operative faces being of such width that an air current of considerable strength is caused to pass the housing of the machine, whereby after the thrashing operation said air current may be utilized in a device for preliminary cleaning of grain separated by a device for conveying the disintegrated straw, said conveying device comprising a drum, a shaft rotatable within said drum helically disposed blades on said shaft, the bottom part of said drum being perforated, a grain collecting channel arranged beneath said bottom part and being passed by said air current.

50. A thrashing machine, comprising a housing having an inlet and an outlet for the material to be thrashed, a rotary shaft within said housing, rotary operating members mounted on said shaft and comprising elastic arms adapted to yield in planes transverse to the shaft, stationary operating members in position for cooperation with said rotary members, and means for rotating said shaft.

51. In a thrashing machine an elongated casing having an inlet and an outlet and carrying stationary and conveying thrashing members, a rotary member therein carrying a multiplicity of thrashing members cooperating with the stationary thrashing and conveying members and a sieve on the bottom of the casing across which the rotating members sweep.

52. In a thrashing machine an elongated casing having an inlet and an outlet, a rotary shaft carrying a plurality of rotating thrashing members, a group of stationary thrashing members disposed around said rotating members but separated therefrom near the inlet of the casing to provide a free whirling space of substantial radial depth for excess material, and a sieve in the bottom of the casing across which the rotating members sweep to remove the unthrashed material and convey it about the machine.

53. A thrashing machine of the character set forth in claim 52 wherein the upper part of the casing is provided with an enlarged or bulged part to form a stowage chamber up above the free whirling space between the cooperating thrashing members.

54. A thrashing machine of the character set forth in claim 52 wherein the upper part of the casing is provided with an enlarged part to form a stowage chamber above the free whirling chamber and throttling means are provided at the outlet end of the machine for the purpose set forth.

55. An axial thrashing machine or the like comprising a housing having an inlet and an outlet for the material to be thrashed, a rotary shaft extending within said housing from said inlet to said outlet, two cooperating groups of working members, one stationary and rigidly connected with the interior of the housing and distributed from the outlet toward the inlet end thereof, the other group being movable with and rigidly mounted on the shaft, the groups being so mounted as to have a circumferential free space between the inner ends of the stationary working members which are nearest the inlet end of the machine and the outer ends of the corresponding cooperating movable members and the radial depth of said free space generally decreasing toward the outlet.

56. An axial thrashing machine of the character set forth in claim 55 wherein the movable working members near the outlet end of the housing extend radially beyond and overlap the inner ends of the stationary members.

57. An axial thrashing machine of the character set forth in claim 55 wherein the free space is circumferentially continuous and large enough to allow the material to be freely whirled within it.

58. An axial thrashing machine of the character set forth in claim 55 wherein the shaft is of a small diameter compared to the diameter of the housing.

59. An axial thrashing machine or the like, comprising a thrashing drum having an inlet and an outlet for the material to be thrashed, a rotatable shaft extending within said drum from said inlet to said outlet, beater arms connected to said shaft, and rigid abutments connected at least to the outlet part of the drum so as to cooperate with said beater arms, the inside of the drum or the inner ends of the abutments near the inlet end of said drum being radially spaced from the outer ends of the beater arms, the outer end portions of the beater arms nearer to the outlet end of the drum overlapping the inner end portions of the abutments, said overlapping increasing towards said outlet end.

60. An axial thrashing machine, comprising a thrashing drum having an inlet and an outlet for the material to be thrashed, a rotatable shaft of comparatively small diameter extending within said drum from said inlet to said outlet, beater arms connected to said shaft, and rigid abutments connected to the drum so as to cooperate with said beater arms, the elements being arranged so as to produce a circumferentially continuous free space around the outer ends of the beater arms near the inlet end of the drum, said space having a substantial radial depth so as to allow the material to be freely whirled within it, the outer end portions of the beater arms nearer to the outlet end of the drum overlapping the inner end portions of the abutments, said overlapping increasing towards the outlet end.

61. An axial thrashing machine or the like, comprising a thrashing drum having an inlet and an outlet for the material to be thrashed, a rotatable shaft of comparatively small diameter extending within said drum from said inlet to said outlet, beater arms connected to said shaft, and rigid abutments connected to the drum so as to cooperate with said beater arms, a circumferential space around the outer ends of the beater arms near the inlet of the drum being provided, the radial distances of the outer ends of the beaters from the inside of the drum or the inner ends of the abutments decreasing in the direction from the inlet to the outlet.

62. An axial thrashing machine of the character set forth in claim 61 wherein the said radial distances decrease gradually or continuously.

63. An axial thrashing machine of the character set forth in claim 61 wherein the said radial distances decrease stepwise.

64. An axial thrashing machine of the character set forth in claim 61 wherein the radial length of said abutments increases in the direction from the inlet end of the machine to the outlet end.

65. An axial thrashing machine of the character set forth in claim 61 wherein the radial length of said beater arms increases in the direction from the inlet to the outlet end of said drum, the inner ends of said rigid abutments being at substantially equal distances from said shaft.

66. An axial thrashing machine of the character set forth in claim 61 wherein the radial lengths of said abutments and of said beater arms increase in the direction from the inlet to the outlet end of the drum.

67. An axial thrashing machine of the character set forth in claim 55 wherein said circumferential space near the inlet end is large enough to allow the material to be freely whirled between the two groups of working members, and the stationary members near the inlet end are composed of obliquely arranged short plates.

68. An axial thrashing machine, comprising a thrashing drum having an inlet and an outlet, rigid abutments mounted on the interior of said drum, a rotatable shaft in said drum, beaters mounted on said shaft, said beaters and abutments being adapted to enter into more and more close cooperation towards the outlet end of the machine, part of the peripheral wall of said drum forming a grate.

69. An axial thrashing machine of the character set forth in claim 68 wherein the grate is removably and interchangeably arranged.

70. An axial thrashing machine comprising a housing, a beater shaft passing through said housing, beaters carried on said shaft and mounted helically thereon and guiding members connected to the helically arranged beaters substantially concentrically with the shaft so as to bridge adjacent beaters for the propulsion of the materials.

71. An axial thrashing machine comprising a thrashing drum, a beater shaft rotatably arranged in said drum and abutments in the form of plates connected radially to the inside of the drum and angularly disposed relatively to said shaft, said plates having low flange-like side walls and beaters on the shaft for cooperating with the said abutments.

72. An axial thrashing machine comprising a thrashing drum, a beater shaft rotatably arranged in said drum, beater arms secured to said shaft, and plates interchangeably and detachably connected to the inside of the drum so as to form abutments for cooperation with said beater arms.

73. An axial thrashing machine comprising a thrashing drum, a beater shaft rotatably arranged in said drum, rotary working members on said shaft, operating members connected in helical rows to the inside of said drum for cooperation with said rotary members and bars applied to the outside of the drum so as to coincide with the operating member helical rows and to serve as means for fastening the operating members to the drum.

74. An axial thrashing machine comprising a thrashing drum, a shaft arranged rotatably in said drum, beater arms connected to said shaft, and single abutments connected circumferentially to and helically arranged upon the inside of the drum for cooperation with said beaters, the abutments and beaters being arranged so as to meet in regular succession and ensure a smooth running of the machine.

75. An axial thrashing machine of the character set forth in claim 55 wherein the rotary operating members are so constructed and arranged and provided in such numbers that merely by virtue of their rotational motion a natural blast of adequate intensity is produced to both convey the material through the thrashing machine proper and to effect after-treatment of the straw leaving the machine.

76. An axial thrashing machine of the character set forth in claim 55 wherein the rotary operating members are so constructed and arranged and provided in such numbers that merely by virtue of their rotational motion a natural blast of adequate intensity is produced to both convey the material through the thrashing machine proper and to effect after-treatment of the straw leaving the machine, and including a sieve surface disposed below a disintegrator grate of the rear machine end and extending to a point in the rear of the machine drum, over which sieve surface the natural blast passing in part through the disintegrator grate, and partly being deflected or by-passed through a collector hood disposed in the rear of the machine drum.

77. A thrashing machine, comprising a beater shaft, a plurality of discs secured to said shaft, a shell adapted to be secured to each disc and adjusted rotatably thereon through small angles to different positions, and beater arms connected tangentially to said shell.

78. An axial thrashing machine, comprising a drum having an inlet and an outlet, a rotatable shaft within said drum, stationary operating members inside of said drum, beater arms on said shaft, means near the outlet to establish more or less free communication of the inner of said drum with the outside.

79. An axial thrashing machine of the character set forth in claim 61 wherein at least some of said beaters comprise an arm and an obliquely arranged plate near the outer end of said arm.

80. An axial thrashing machine comprising a thrashing drum having an inlet and an outlet for the material to be thrashed, a rotary shaft extending within said drum from said inlet to said outlet, beater arms connected to said shaft and rigid abutments connected at least to the outlet part of the drum, a circumferential space being provided around the outer ends of the beaters at the inlet side of the beaters, with the beaters at the inlet side of the drum forming thrashing means and the abutments and the beaters at the outlet side of the drum forming disintegrating means, and means intermediate said thrashing and disintegrating means for preparing the thrashed materials for disintegration.

81. An axial thrashing machine of the character set forth in claim 68, wherein said grate comprises bars with inwardly directed edges which are provided with sawlike teeth.

82. A thrashing machine of the character set forth in claim 2 wherein the sieves form inwardly projecting flattened portions of the cylindrical wall of said housing.

83. An axial thrashing machine of the character set forth in claim 8 wherein the movable members are carried by ring bodies which have diameters at least twice the diameter of the said shaft.

84. An axial thrashing machine of the character set forth in claim 46 wherein the rotary operating members are so constructed and arranged and provided in such numbers that merely by virtue of their rotational motion a natural blast of adequate intensity is produced to both convey the material through the thrashing machine proper and to effect after-treatment of the straw leaving the machine.

85. An axial thrashing machine of the character set forth in claim 46 wherein the rotary operating members are so constructed and arranged and provided in such numbers that merely by virtue of their rotational motion a natural blast of adequate intensity is produced to both convey the material through the thrashing machine proper and to effect after-treatment of the straw leaving the machine, and including a disintegrator grate and sieve surface disposed therebelow and extending to a point in the rear of the machine drum, and a collector hood disposed in the rear of the machine drum, the natural blast passing over the sieve surface in part through the disintegrator grate and partly being deflected or by-passed through the hood.

In testimony whereof I affix my signature.

FELIX SCHLAYER.

CERTIFICATE OF CORRECTION.

Patent No. 1,744,334. Granted January 21, 1930, to

FELIX SCHLAYER.

It is hereby certified that error appears in the printed specification of the above numbered patent requiring correction as follows: Page 6, line 125, strike out the word "rigid"; page 12, line 17, claim 23, for the words "that at least" read "at least that"; page 16, line 31, claim 72, for the word "heater" read "beater"; and that the said Letters Patent should be read with these corrections therein that the same may conform to the record of the case in the Patent Office.

Signed and sealed this 4th day of March, A. D. 1930.

(Seal)

M. J. Moore,
Acting Commissioner of Patents.